United States Patent [19]

Winnik et al.

[11] Patent Number: 4,795,794
[45] Date of Patent: Jan. 3, 1989

[54] PROCESSES FOR COLORED PARTICLES FROM POLYMERIZABLE DYES

[75] Inventors: Francoise M. Winnik, Toronto; Christopher K. Ober; Melvin D. Croucher, both of Oakville, all of Canada

[73] Assignee: Xerox Corporation, Stamford, Conn.

[21] Appl. No.: 783,729

[22] Filed: Oct. 3, 1985

[51] Int. Cl.$^4$ .................. C08F 32/08; C08F 26/06; G03C 9/08

[52] U.S. Cl. .................. 526/259; 526/280; 526/284; 430/107; 430/109; 430/114; 430/137

[58] Field of Search .............. 428/402; 526/259, 280, 526/284; 430/107, 109, 114, 137

[56] References Cited

U.S. PATENT DOCUMENTS

| | | | |
|---|---|---|---|
| 3,467,642 | 9/1969 | Horiguchi et al. | 260/141 |
| 3,591,661 | 7/1971 | Rogers | 526/284 |
| 3,637,596 | 1/1972 | Gulbins et al. | 526/284 |
| 4,093,793 | 6/1978 | Champenois | 526/280 |
| 4,132,841 | 1/1979 | Champenois | 526/284 |
| 4,144,252 | 3/1979 | Wang | 526/284 |
| 4,182,885 | 1/1980 | Bunes | 526/259 |
| 4,267,319 | 5/1981 | Degen | 526/259 |
| 4,282,304 | 8/1981 | Bayley . | |
| 4,293,627 | 10/1981 | Murphy et al. | 430/39 |
| 4,314,931 | 2/1982 | Hoffend et al. | 260/42.53 |
| 4,330,460 | 5/1982 | Hoffend et al. | 524/849 |

FOREIGN PATENT DOCUMENTS 50451 9/1957 Japan .

OTHER PUBLICATIONS

Chem. Abstr. 101:81646u (1984).

Primary Examiner—Paul R. Michl
Assistant Examiner—Patrick A. Doody
Attorney, Agent, or Firm—E. O. Palazzo

[57] ABSTRACT

Disclosed is a dispersion polymerization process for affecting the preparation of particles which comprises dissolving in a suitable solvent a mixture of at least two first monomer components including at least one second monomer having covalently attached thereto a dye moiety, subsequently adding to the reaction mixture a polymerization initiator, thereafter affecting polymerization of the reaction mixture by heating, and separating the product particles therefrom.

26 Claims, No Drawings

PROCESSES FOR COLORED PARTICLES FROM POLYMERIZABLE DYES

BACKGROUND OF THE INVENTION

This invention is generally directed to processes for affecting the preparation of particles, and more specifically the present invention is directed to the preparation of colored toner compositions by dispersion polymerization. In one embodiment, thus the present invention encompasses dispersion polymerization processes wherein a monomer with a dye permanently attached thereto is selected. Accordingly, there can be prepared in a simple and economical manner self-colored particles inclusive of toner particles by the dispersion polymerization of two or more monomers, one of which is comprised of a dye molecule covalently attached to a monomer component. Depending on the processing parameters, particle sizes of, for example, from about 5 to 20 microns are achievable; however, particles with a smaller size of from, for example, about 0.1 to 3 microns can also be generated. Therefore, the resulting particles are useful as dry toner particles, or liquid toner compositions. These toner compositions can be selected for enabling the development of images in electrostatographic imaging, particularly electrostatic imaging systems, inclusive of dry and liquid development processes.

The development of images, and in particular electrostatic images utilizing developer compositions with toner materials, is well known. In many of these processes, an electrostatic latent image is formed on a photoconductive member, followed by development with a dry toner composition comprised of resin component and carbon black. Subsequently, the developed image is transferred to a suitable substrate wherein fixing is accomplished by, for example, heat. There is also known development systems wherein the images are rendered visible with liquid developer compositions.

Emulsion or suspension polymerization processes for obtaining toner compositions are also known. There is thus disclosed in U.S. Pat. No. 4,282,304 a suspension polymerization method wherein magnetic particles are first mixed with monomer and an initiator. Subsequently this mixture is suspended in an aqueous medium wherein a reaction within each particle ensues. The particles formed are then removed from the aqueous medium, and further processed for use as toner compositions. Also, there is disclosed in the prior art the selection of stabilizing compounds inclusive of methylhydroxy propyl cellulose for obtaining toner compositions prepared by emulsion or suspension polymerizations.

Furthermore, in U.S. Pat. No. 4,524,199, the disclosure of which is totally incorporated herein by reference, there is described a stable polar dispersion with nonionic amphiphathic steric stabilizers irreversibly anchored to a polymer particle. Stabilizers disclosed in this patent are cellulose compounds including hydroxyethyl cellulose. Also, in U.S. Pat. No. 4,476,210, the disclosure of which is totally incorporated herein by reference, there is described a stable colored liquid developer comprised of an insulating liquid dispersion medium having dispersed therein marking particles comprising a thermoplastic resin core substantially insoluble therein. There is further included in the aforementioned liquid developer an amphipathic block, or graft copolymeric soluble steric stabilizer irreversibly, chemically or physically attached to the thermoplastic resin core. Furthermore, there is included in the liquid developer of the U.S. Pat. No. 4,476,210 patent a colored dye imbibed in the thermoplastic resin core, the dye being soluble in the core, and insoluble in the dispersion medium. Examples of dyes that may be selected include Orasol Blue GN, Orasol Red 2BL, Orasol Blue BLN, Orasol Yellow, Morfast Red 101, Savinyl Pink CDLS, and Savinyl Red 3BLS. The process of the present invention is similar to the dispersion polymerization process of the aforementioned patent with the exception that in the present process there is selected a further monomer with a dye permanently attached thereto enabling the preparation of colored particles in a direct manner.

Also, with the process of the present invention, there can be provided the direct coloring of the particles thereby eliminating the need for separate processing steps. Further, the process of the present invention prevents the diffusion of the dye moles from inside of the particles thereby permitting the electrical characteristics of the marking materials to be retained during storage. Additionally, the covalent attachment of the colorant into the polymer backbone in accordance with the process of the present invention assists in eliminating and/or reducing the harmful toxicological effects of the colorant. Furthermore, the process of the present invention does not require a separate dyeing step as is the situation with the process illustrated in U.S. Pat. No. 4,476,210.

There is also described in Canon Japanese Patent Publication No. 5964853 toners for electrophotography obtained by copolymerizing colored monomers obtained from the reaction of nigrosine or other organic dyes with halogen containing monomers. According to the abstract of this publication, the resulting toner has ample coloration and does not produce background fog. In contrast to the process of the present application, the toner of the Canon patent publication is prepared by suspension polymerization. In this suspension polymerization process, the monomer/dye mixture is initially suspended in an aqueous medium to enable the formation of an emulsion. With dispersion polymerization processes, the monomers and amphiphatic stabilizers selected are initially soluble in an aqueous or nonaqueous dispersion medium. As the dispersion polymerization proceeds, particles are formed to yield a two phase system. An advantage of the dispersion polymerization process resides in its ability to control both the particle size and the particle size distribution of the final polymer particles relative to other particle polymerization processes such as suspension polymerization. Further, dispersion polymerization processes usually generate largely electrostatically neutral particles since the number of constituents present therein is substantially less, and also these constituents are all nonionic species.

There thus continues to be a need for improved processes for preparing colored toner particles useful as dry toner compositions, or liquid toner compositions. More specifically, there remains a need for generating self-colored toner particles by a simple and economical process. Additionally, there is a need for dispersion polymerization processes wherein toner particles of an appropriate size diameter can be generated in a single processing step. Also, there is a need for processes that permit colored toner compositions by dispersion polymerization wherein there is selected a monomer component having attached thereto a dye moiety. There also remains a need for dispersion polymerization processes wherein there is selected as one of the monomers a chromophore covalently linked to a polymerizable group inclusive of vinyl, methacryloyl or acryloyl moieties. Furthermore, there is a need for dispersion polymerization processes where there can be generated toner particles of a diameter of from about 0.1 to about 20 microns. There is also a need for obtaining dry, or liquid toner compositions which are useful for affecting the development of images in electrographic imaging processes inclusive of xerographic processes.

SUMMARY OF THE INVENTION

It is object of the present invention to provide processes for preparing particles which overcome several of the above noted disadvantages.

In a further object of the present invention there are provided dispersion polymerization processes wherein self-colored particles are generated.

In an additional object of the present invention there are provided dispersion polymerization processes for preparing toner particles wherein there is selected a chromophore monomer.

Also, in yet an additional object of the present invention there are provided dispersion polymerization processes wherein particles of a diameter of from 0.1 to about 15 microns are generated with aliphatic hydrocarbons.

In still yet an additional object of the present invention there are provided dispersion polymerization processes wherein particles of a diameter of from 1 to about 20 microns are generated in polar liquids such as alcohols.

In yet another object of the present invention there are prepared colored toner particles in one processing step by selecting for polymerization comonomers inclusive of a monomer having covalently attached thereto a chromophore moiety.

A further object of the present invention resides in the provision of dispersion polymerization processes for obtaining self-colored particles, inclusive of toner particles, where the resulting toner compositions can be selected for use in developing images in electrostatic imaging apparatuses.

These and other objects of the present invention are accomplished by the provision of a dispersion polymerization process for generating colored particles. More specifically, in one embodiment there is provided in accordance with the present invention a dispersion polymerization process which comprises providing a medium having dispersed therein two or more individual monomers inclusive of at least one monomer having covalently attached thereto chromophore moieties. Therefore, in one specific embodiment of the present invention there are provided dispersion polymerization processes for formulating particles of an average size diameter of from about 0.1 to about 20 microns which comprise providing a fluid medium having molecularly dispersed therein at least one first vinyl monomers, such as styrene, vinyl acetate, N-vinyl-2-pyrrolidone, alkyl methacrylates, and alkyl acryates; wherein alkyl includes, for example, methyl, ethyl, propyl, butyl and pentyl; and second vinyl monomers to which are covalently attached dye moieties including dicarboxyimide dyes; subsequently adding initiator to the resulting mixture; affecting polymerization of this mixture by heating; and thereafter separating the resulting product particles from the mixture. There thus results particles with the dye moiety covalently attached to the polymer backbone as evidenced by analytical tools, including NMR analysis, GPC analysis, and known extraction techniques.

With further respect to the process of the present invention as described herein, there is usually selected one colorless or clear monomer, such as styrene, and a monomer inclusive of vinyl monomers to which are covalently attached dye moieties. Additionally, there can be selected for the process of the present invention mixtures of monomers inclusive of, for example, two or more colorless monomers in combination with one or more monomers with dye moieties covalently, permanently attached thereto. Other mixtures of colorless and colored monomers with dye moieties attached thereto may be selected providing the objectives of the present invention are achievable.

Specifically, thus the process of the present invention is effected by dissolving in an appropriate solvent, a first monomer or monomers in an amount of from about 90 weight to about 99.5 weight percent; and a second monomer, such as a vinyl monomer, or a monomer containing a methacryloyl group in an amount of from about 10 percent to about 0.5 percent with a dye covalently attached thereto. Thereafter there is added to the resulting mixture, in an amount of from about 0.1 weight percent to 1.0 weight percent, a known polymerization initiator inclusive of azobis compounds. The resulting mixture is then heated to a temperature of from about 45° C. to about 110° C., and preferably from about 50° C. to about 100° C., for the purpose of affecting polymerization thereof. Subsequent to cooling, the product particles are separated from the reaction mixture by usual known techniques, including filtration. There results colored particles of a diameter of from about 0.1 to about 20 microns. The particles obtained are then subjected to IR analysis, NMR analysis, and preferably to gel permeation chromatography, for the purpose of establishing that the dye is present in the final polymer products obtained. Additionally, it is known that the dye is covalently attached to the resulting polymer backbone as evidenced by, for example, gel permeation chromatography with a UV-visible detector, and by solvent extraction techniques.

As first monomers or comonomers there can be selected styrene; p-chlorostyrene; vinylesters inclusive of vinylacetate; and vinylbenzoate; vinylethers such as vinylisobutylether, N-vinyl-2-pyrrolidone, alkyl acrylates and methacrylates, such as methylmethacrylate, ethylacrylate, n-butylacrylate, isobutylacrylate, phenylacrylate, methylacrylate, ethylmethacrylate, n-butylmethacrylate, and the like. As second monomers or comonomers there are selected chromophores covalently linked to a polymerizable group inclusive of vinyl, methacryloyl, acryloyl, and derivatives thereof. More specifically, the chromophores are covalently and permanently linked to a polymerizable group.

The aforementioned second monomer component can be prepared by known processes including the reaction of this monomer, inclusive of vinyl compounds possessing a reactive function group such as an acyl halide, sulfonyl halide, and other similar groups with a chromophore. There results a component with a stable group such as an ester, an ether, or a sulfonate, between the chromophore and the vinyl moiety. More specifically, thus for example, methacryloyl chloride can be reacted in the presence of an amine with a chromophore containing a hydroxyl group enabling the formation of a methacrylate. Other similar second monomeric components can be obtained, and are useful in the process of the present invention providing the objectives thereto are achievable.

Various suitable chromophores can be selected for the process of the present invention. Examples of yellow chromophores covalently attached to polymerizable groups include 1-phenylthio-5-(3'-methacryloylamidothiophenyl)-anthraquinone, 1-(3'-methacryloylamidophenylthio)-anthraquinone, 1-(4'-tert-butylphenylthio)-5-(3'-methacryloylamidophenylthio)-anthraquinone, and the like. Blue chromophores covalently attached to polymerizable groups include 4-amino-1,8-dihydroxy-2,7-diisobutyl-5-methacryloylamidoanthraquinone, 4-amino-1,8-dihydroxy-2,7-diisopropyl-5-methacryloylamidoanthraquinone, 4-amino-1,5-dihydroxy-2,6-diisobutyl-8-methacryloylamidoanthraquinone, and the like. Among cyan chromophores covalently attached to polymerizable groups are N-(3'-methacryloylamidopropyl) 1,4-diaminoanthraquinone-2,3-dicarboximide, N-(6'-methacryloylamidohexyl) 1,4-diaminoanthraquinone-2,3-dicarboximide, N-(6'-methacryloylhexyl) 1,4-diaminoanthraquinone-2,3-dicarboximide, and the like.

Purple chromophores that may be covalently attached to polymerizable groups include N-(3'-methacryloylpropyl) 1-amino-4-methacryloylamidoanthraquinone-2,3-dicarboximide, and the like. Examples of magenta chromophores covalently attached to polymerizable groups include 1-amino-4-hydroxy-2-(N-3'-methacryloylpropylamino)-anthraquinone, 1-amino-4-hydroxy-2-(N-3'-methacryloylhexylamino)-anthraquinone, 1-amino-4-hydroxy-2-(N-3'-methacryloylamidohexylamino)-anthraquinone, 1-amino-4-hydroxy-2-(3'-methacryloylhexylthio)-anthraquinone, and the like.

Red chromophores that may be covalently linked to polymerizable groups include those of the following structure: 1,5-dihydroxy-2,6-diisobutyl-4-(3'-methacryloylamidophenylthio)-anthraquinone, 1,8-dihydroxy-2,7-diisobutyl-4-(3'-methacryloylamidophenylthio)-anthraquinone, 1,5-dihydroxy-2,6-diisobutyl-4-methacryloylamidoanthraquinone, 1,8-dihydroxy-2,7-diisobutyl-4-methacryloylamidoanthraquinone, 1,8-dihydroxy-2,7-diisopropyl-4-methacryloylamidoanthraquinone, 1,4,5-triphenylthio-8-(3'-methacryloylamidophenylthio)-anthraquinone, and the like.

One preferred purple dye second monomer molecule selected for the process of the present invention is N-(3'-methacryloylpropyl) N-amino-4-(N-methacrylamido)anthraquinone-2,3-dicarboximide of the following formula:

cryloylamidoanthraquinone of the following formula obtained by the reaction of methacryloyl chloride and 4-amino-1,5-dihydroxy-2,6-diisobutylanthraquinone:

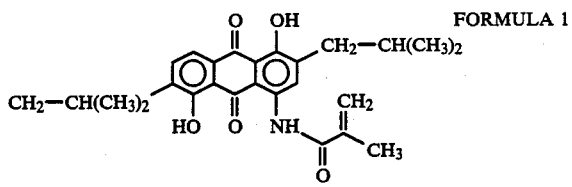

FORMULA 1

Free radical initiators that can be selected for the polymerization process of the present invention are benzoyl peroxide, lauroyl peroxide, tertbutylhydroperoxide, azobisisobutyronitrile and the like. These initiators are usually added in an amount of from about 0.1 percent by weight of monomers to about 1 percent by weight of monomers.

Examples of solvents useful in the process of the present invention include water; aliphatic alcohols such as methanol, ethanol, propanol, butanol; cellosolves such as methyl cellosolve, ethyl cellosolve and butyl cellosolve; aliphatic hydrocarbons such as hexane, cyclohexane, heptane, and Isopar G; and mixtures thereof. These solvents are selected in an amount of from about 50 percent to about 90 percent of the total reaction volume, however, other amounts that will enable the dissolution of the monomer components can be used providing that a homogeneous polymerization mixture results.

There results particles of an average size diameter of from about 0.1 to about 20 microns. However, the selected solvent monomer mixtures can be comprised of compositions wherein the particle size diameters are varied in a consistent and controlled manner depending, for example, on the components selected and the reaction conditions propogated. Therefore, for example, when an aliphatic hydrocarbon is selected as a solvent, particles of an average diameter of 0.1 to about 20 microns; and preferably from about 0.1 to 8 microns, are obtainable. With polar liquids such as alcoholic solvents, the particles of from about 1 to about 20 microns; and preferably from about 1 to about 15 microns average diameter, are obtainable.

An important achievement with the process of the present invention resides in affecting immobilization of the dye moiety preventing the chromophore selected from causing toxicological problems, as the chromophore is prevented from diffusing out of the polymer particle. Further, since diffusion is limited by this immobilization, the particles exhibit better electrical stability

FORMULA 4

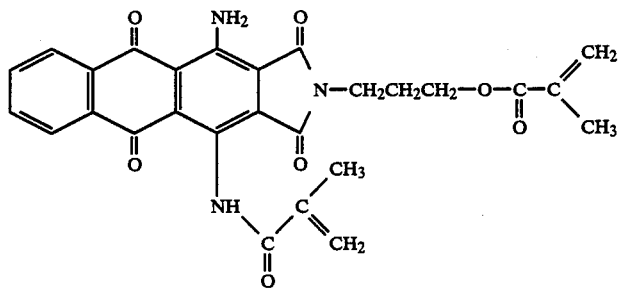

As a preferred red second monomer molecule selected for the process of the present invention, there can be used a 1,5-dihydroxy-2,6-diisobutyl-4-methain electrographic and electrophotographic marking particles. This immobilization of the dye moiety also prevents leaching and bleeding of the colorant upon storage of the toner or during the development process.

Toner particles can then be formulated by subjecting the mixture of colored particles and solvent medium obtained from the polymerization reaction to further processing inclusive of known spray drying or freeze drying methods thereby permitting the isolation of toner particles. Specifically, thus in one embodiment spray drying of the mixture is affected, for example, by pumping a stirred suspension of colored particles and solvent mixture with a peristaltic pump to a spray drying nozzle. Subsequent to atomization, the suspension is dried at 120° C. in a drying chamber and collected in a product cyclone. The toner particles isolated, especially those with a diameter of about 5 to 20 microns, can be selected for two-component imaging processes by mixing carrier particles therewith; or alternatively, can be selected for incorporation into single-component electrostatic imaging processes such as those illustrated in U.S. Pat. No. 4,459,009, the disclosure of which is totally incorporated herein by reference. Examples of carrier particles that can be selected include those with a core of steel, iron, ferrites, glass, nickel berry, and other similar substances. These cores can be optionally coated with known polymers, like polyvinylidenefluoride, terpolymers of styrene, methacrylate, and vinyltriethoxysilane, polymethacrylates, reference for example U.S. Pat. Nos. 3,526,533 and 3,467,634, the disclosures of which are incorporated herein by reference, and other equivalent compounds. In an alternative embodiment, there can be included in the developer compositions flow enhancing additives, such as fumed silica, both hydrophilic and hydrophobic, alumina, terephthalic acid, metallic stearates, and the like, reference for example U.S. Pat. Nos. 3,720,617 and 3,983,045, the disclosures of which are incorporated herein by reference. The aforementioned additives also function to impart a positive or negative charge to the toner particles. An additive that imparts a positive charge to these particles is alumina, while examples of additives that impart a negative charge to the toner particles include fumed silica, terephthalic acid, and zinc stearate. Further, these additives can be incorporated into the developer composition in various effective amounts providing the objectives of the present invention are achieved; however, preferably from about 0.1 percent by weight to about 10 percent by weight of the additives are selected.

Moreover, the self-colored polymer particles prepared in accordance with the present invention are useful as liquid developer compositions. These compositions are comprised of nonaqueous solutions of the self-colored polymer particles illustrated herein dispersed in a suitable vehicle, such as Isopar G; and a charge control agent inclusive of a metal soap. Specific examples of liquid ink developer compositions, therefore, include those comprised of a dispersion of colored particles prepared in accordance with the process of the present invention, present in Isopar in an amount of from about 0.3 to about 2 weight percent, which Isopar further includes from about 0.05 to about 0.5 weight percent of a charge control agent such as zirconium octoate. Subsequent to equilibrium, the particles possess a charge/mass ratio of about 100 to about 1,000 ucg$^{-1}$.

The aforementioned liquid developers are useful in known imaging and printing processes, including the Versatec V-80 printer.

The following examples are being supplied to further define specific embodiments of the present invention, it being noted that these examples are intended to illustrate and not limit the scope of the present invention. Parts and percentages are by weight unless otherwise indicated.

EXAMPLE I 1,5-dihydroxy-2,6-diisobutyl-4-methacryloylamidoanthraquinone (Formula 1)

The starting material for the preparation of this dye was 1,5-dihydroxy-2,6-diisobutylanthraquinone obtained as described, for example, in British Patent Publication No. 2,081,736A (1981), the disclosure of which is totally incorporated herein by reference. The synthesis was performed in three steps:

There was first prepared a 1,5-dihydroxy-2,6-diisobutyl-4-nitroanthraquinone product by adding 200 grams of 1,5-dihydroxy-2,6-diisobutylanthraquinone to a solution of concentrated sulfuric acid (1.5 liters) and boric acid (109.0 grams) kept at 50° C. At the end of the addition, the reaction mixture was cooled slowly to 0° C. A nitrating mixture (200.0 milliliters) of concentrated nitric acid/concentrated sulfuric acid (33/67) was then added over a period of 3 hours, at a rate to prevent the temperature from exceeding 1° C. At the end of this addition, the reaction mixture was maintained at 4° C. for 4.5 hours. Thereafter the reaction mixture was poured into ice (5 kilograms) and filtered. The orange solid resulting product was washed with water and methanol. This product was then recrystallized from nitroethane (1.6 liters) yielding 186 grams, 83 percent of a product with a m.p. 180°–181.5° C.; Lambda$_{max}$(CH$_2$Cl$_2$) 446 nanometers.

There was then prepared 4-amino-1,5-dihydroxy-2,6-diisobutylanthraquinone by heating a suspension of the above prepared 1,5-dihydroxy-2,6-diisobutyl-4-nitroanthraquinone product (5.0 grams) and sodium sulfide nonahydrate (12.1 grams) in water (40.0 milliliters) and ethanol (40.0 milliliters) at 90° C. for 3 hours. On completion of the reaction, the mixture was cooled to room temperature and the product obtained was separated by filtration. This product was then washed with methanol and recrystallized from methyl cellosolve to yield 4-amino-1,5-dihydroxy-2,6-diisobutylanthraquinone (4.6 grams, 99 percent); with a Lambda$_{max}$ (CH$_2$Cl$_2$) 532, 572 nanometers.

Finally, there was prepared 1,5-dihydroxy-2,6-diisobutyl-4-methacryloylamidoanthraquinone (Formula 1) by adding dropwise to a solution the above prepared 4-amino-1,5-dihydroxy-2,6-diisobutylanthraquinone (2.0 grams) in chloroform (40.0 milliliters) and triethylamine (2.0 grams) kept at 0° C., a solution of methacryloyl chloride (1.0 milliliters) in chloroform (5.0 milliliters). At the end of the addition the mixture was maintained at 4° C. for 2 hours, then at 15° C. for 2 hours. After quenching of the resulting residual methacryloyl chloride with methanol (1.0 milliliter), the mixture was concentrated in vacuo. Thereafter, the residue was treated with methanol. Filtration yield the dye monomer of Formula 1 (1.8 grams, 76 percent) which was purified further by recrystallization from methyl cellosolve. This Formula 1 dye product had a Lambda$_{max}$(CH$_2$Cl$_2$) 512 nanometers; $^1$H NMR (CDCl$_3$) 0.96 (6H, d, 7 Hz), 0.97 (6H, d, 7 Hz), 2.16 (3H, br s), 1.8–2.1 (2H, m), 2.64 (2H, d, 7 Hz), 2.66 (2H, d, 7 Hz), 5.62 (1H, d, 1 Hz), 6.09 (1H, s), 7.65, 7.8 (2H, AB q, 8 Hz), 9.07

(1H, s), 13.07 (1H, s, exchangeable), 14.03 (1H, s, exchangeable) ppm; M/z (M+)435.

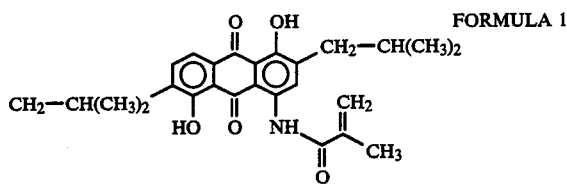

FORMULA 1

EXAMPLE II

1,5-dihydroxy-2,6-diisobutyl-4-(3'-methacryloylamidophenylthio)-anthraquinone (Formula 2)

The starting material for the preparation of this dye-monomer was 1,5-dihydroxy-2,6-diisobutyl-4-nitroanthraquinone, the synthesis of which was described in Example I.

There was first prepared 1,5-dihydroxy-2,6-diisobutyl-4-(3'-aminophenylthio)-anthraquinone by adding 1,5-dihydroxy-2,6-diisobutyl-4-nitroanthraquinone (5.0 grams) to a solution of 3-aminothiophenol (1.57 grams) and potassium hydroxide (0.70 gram) in isopropanol (100 milliliters) maintained at 45° C. Upon the addition completion, the resulting reaction mixture was kept at 45° C. for 45 minutes, followed by cooling to room temperature. The red solid formed was separated by filtration and purified by recrystallization from ethyl acetate (4.25 grams, 59 percent yield); m.p. 180°–182° C.; Lambda$_{max}$(CH$_2$Cl$_2$) 516 nanometers.

There was then prepared 1,5-dihydroxy-2,6-diisobutyl-4-(3'-methacryloylamidophenylthio)-anthraquinone (Formula 2) by adding dropwise to a solution of the prepared 1,5-dihydroxy-2,6-diisobutyl-4-(3'-aminophenylthio)-anthraquinone (0.8 gram) in chloroform (20.0 milliliters) while maintaining the temperature below 4° C. The mixture was maintained at 4° C. for 30 minutes. After quenching of the residual methacryloyl chloride with methanol (1.0 milliliter), the mixture was concentrated in vacuo, and the residue was treated with methanol. Filtration provided the dye monomer of Formula 2 (0.78 gram, 85 percent) which was purified further by recrystallization from methyl cellosolve; Lambda$_{max}$(CH$_2$Cl$_2$) 514 nanometers; $^1$H NMR(CDCl$_3$) 0.78 (6H, d, 7 Hz), 0.95 (6H, d, 7 Hz), 1.8–2.2 (2H, m), 2.17 (3H, s), 2.52 (2H, d, 7 Hz), 2.66 (2H, d, 7 Hz), 5.47 (1H, m), 5.79 (1H, br s), 6.88 (1H, br s), 7.35–7.90 (7H, m), 13.01 (1H, br s, exchangeable), 13.81 (1H, br s, exchangeable) ppm; M/z(M+)543.

EXAMPLE III

4-amino-1,8-dihydroxy-2,7-diisobutyl-5-methacryloylamidoanthraquinone (Formula 3)

The starting material for the synthesis of this dye monomer was 4,5-diamino-1,8-dihydroxy-2,7-diisobutylanthraquinone obtained from 1,8-dihydroxyanthraquinone, as described for example in British Patent Publication No. 2,081,736A (1981), the disclosure of which is totally incorporated herein by reference. There was prepared 4-amino-1,8-dihydroxy-2,7-diisobutyl-5-methacryloylamidoanthraquinone (Formula 3) by adding dropwise to a solution of 4,8-diamono-1,8-dihydroxy 2,7-diisobutylanthraquinone (1.0 gram) in chloroform (25.0 milliliters) and triethylamine (1.0 gram) kept at 0° C., a solution of methacryloyl chloride (0.5 milliliter) in chloroform (3.0 milliliters) while maintaining the temperature below 4° C. Subsequent to addition the mixture was maintained at 4° C. for 30 minutes. After quenching of the residual methacryloyl chloride with methanol (1.0 milliliter) the mixture was concentrated in vacuo. Filtration provided the dye monomer of Formula 3 (0.78 gram, 63 percent) which was purified further by recrystallization from methyl cellosolve; Lambda$_{max}$(CH$_2$Cl$_2$) 562, 606 nanometers; $^1$H NMR(CDCl$_3$) 0.96 (12H, d, 7 Hz), 1.62 (3H, s), 1.9–2.2 (2H, m), 2.56 (2H, d, 7 Hz), 2.65 (2H, d, 7 Hz), 5.53 (1H, br s), 6.11 (1H, br s), 6.81 (1H, br s), 6.95 (3H, br s, exchangeable), 9.09 (1H, br s), 13.31 (1H, br s, exchangeable), 13.41 (1H, br s, exchangeable); M/z(M+)450.

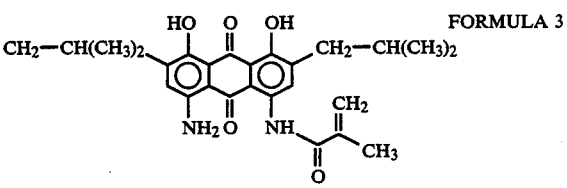

FORMULA 3

EXAMPLE IV

N-(3'-methacryloylpropyl)1-amino-4-(N-methacrylamido)anthraquinone-2,3-dicarboximide (Formula 4)

This compound was prepared from 1,4-diaminoanthraquinone-2,3-dicarboximide obtained from the bromaminic acid sodium salt, as described for example in the German Patent Publication DE No. 3,003,656, the disclosure of which is totally incorporated herein by reference. The dicarboximide can also be prepared by hydrolysis of 1,4-diamino-2,3-dicyanoanthraquinone, as described in U.S. Pat. No. 2,628,963, the disclosure of which is totally incorporated hereby by reference.

There was first prepared N-(3'-hydroxypropyl)1,4-diaminoanthraquinone-2,3-dicarboximide by forming a suspension of 1,4-diaminoanthraquinone-2,3-dicarboximide (15.0 grams) and 1-amino-3-propanol (28.6 grams) in methyl cellosolve (200 milliliters) heated at 120° C. for 6 hours. The reaction mixture was cooled to room temperature, and then in ice for several hours. Thereaf-

FORMULA 2

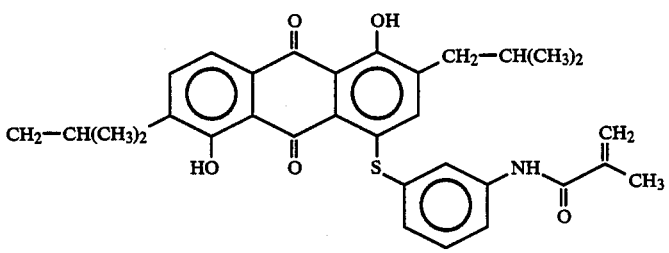

ter the mixture was filtered and washed with methanol (600.0 milliliters). The product obtained was dried in vacuo for 8 hours at 45° C. yielding N-(3'-hydroxypropyl) 1,4-diaminoanthraquinone-2,3-dicarboximide (16.8 grams, 81 percent); m.p. 261°-262° C.; Lambda$_{max}$(CH$_2$Cl$_2$) 672 nanometers.

There was then prepared N-(3'-methacryloylpropyl)1-amino-4-(N-methacrylamido)anthraquinone-2,3-dicarboximide (Formula 4) by heating at 70° C. a suspension of the prepared N-(3'-hydroxypropyl) 1,4-diaminoanthraquinone-2,3-dicarboximide (4.0 grams) in pyridine (40.0 milliliters) until complete dissolution. Methacryloyl chloride (2.4 milliliters) was added dropwise while maintaining the temperature at 70° C. After the addition the mixture was kept at 70° C. for 1 hour. Thereafter, the reaction mixture was cooled in an ice bath, and a precipitate formed which was separated by filtration. The crude compound was recrystallized from methyl cellosolve yielding the dye monomer of Formula 4 (3.2 grams, 58 percent); Lambda$_{max}$(CH$_2$Cl$_2$) 552 nanometers; $^1$H NMR(CDCl$_3$) 1.93 (3H, br s), 2.08 (2H, t, 7 Hz), 2.15 (3H, br s), 3.70 (2H, t, 7 Hz), 4.21 (2H, t, 7 Hz), 5.53 (1H, m), 5.63 (1H, br s), 6.11 (2H, br s), 7.1–7.3 (1H, br s, exchangeable), 7.8–8.3 (4H, m), 8.9–9.3 (1H, br s, exchangeable), 10.77 (1H, br s, exchangeable) ppm; M/z(M+)501.

(1H, m), 6.02 (1H, m), 7.4–8.3 (8H, m, 4H exchangeable) ppm; M/z(M+)433.

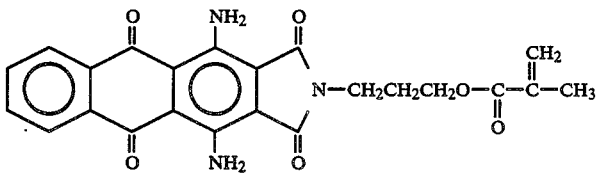

FORMULA 5

EXAMPLE VI

Self-colored Toner Particles with Compound of Formula 1

There were prepared self-colored (colored during the polymerization) copolymer particles by first dissolving poly(acrylic acid) (3.0 grams) in ethanol (200.0 milliliters) and water (18.0 milliliters). This mixture was placed in a 500 milliliter three-necked round bottom flask under nitrogen atmosphere with stirring at 68° C. To the homogeneous mixture was added benzoyl peroxide (1.5 grams) dissolved in a styrene monomer (24.0 milliliters), n-butyl methacrylate monomer (16.0 milliliters), and the prepared monomeric dye, 1,5-dihydroxy-2,6-diisobutyl-4-methacryloylamidoanthraquinone (Formula 1) (0.3 gram) permitting polymerization thereof. In approximately 10 minutes the polymerization mixture became cloudy indicating the formation of polymer particles. After polymerizing for 30 hours, the mixture was cooled and the particles removed from the medium by centrifugation followed by decantation of the supernatant. The resulting particles were washed once in methanol, and twice with water by means of centrifugation. The aqueous suspension was then freeze dried at 0° C. to remove the particles from water, producing a free flowing red-colored toner polymer powder. The average diameter particle size of this powder as determined by a Coulter Counter was 11.1 microns with a GSD of 1.27. Incorporation of the dye on the polymer was demonstrated by gel permeation chromatography (GPC) of the particles dissolved in tetrahydrofuran. Also, the absorption spectrum of the high molecular weight fraction resulting from the GPC showed an absorption maximum in the visible (Lambda$_{max}$ 512 nanometers) due to the absorption of the dye chromophore which is attached to the polymer backbone, whereas no colored low molecular weight components were detected further evidencing the presence of polymerized dye in the polymer particles

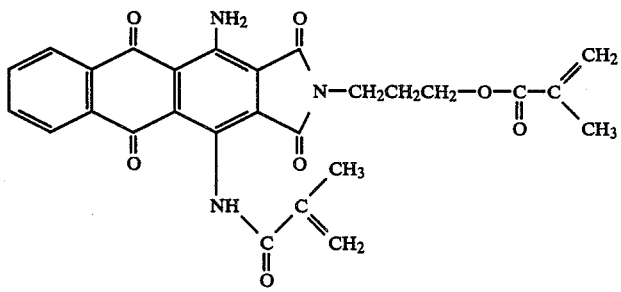

FORMULA 4

EXAMPLE V

N-(3'-methacryloylpropyl)1,4-diaminoanthraquinone-2,3-dicarboximide (Formula 5)

There was prepared N-(3'-methacryloylpropyl)1,4-diaminoanthraquinone-2,3-dicarboximide (Formula 5) by heating at 50° C. a suspension of the prepared 1,4-diaminoanthraquinone-2,3-dicarboximide (4.0 grams), reference Example IV in dry pyridine (40 milliliters) until complete dissolution. Methacryloyl chloride (1.3 milliliters) was added dropwise while maintaining the temperature at 50° C. At the end of the addition, the mixture was kept at 50° C. for 3 hours, and at room temperature for 17 hours. After evaporation of the solvent in vacuo, the residue was recrystallized from methanol (20 milliliters) yielding the dye monomer of Formula 5 (3.1 grams, 67 percent); Lambda$_{max}$(CH$_2$Cl$_2$) 680 nanometers; $^1$H NMR (CDCl$_3$) 1.94 (3H, br s), 2.03 (2H, t, 7 Hz), 3.69 (2H, t, 7 Hz), 4.16 (2H, t, 7 Hz), 5.47

EXAMPLE VII

Self-colored Toner Particles with Compound of Formula 2

There were prepared self-colored polymer particles by first dissolving poly(acrylic acid) (3.0 grams) in ethanol (87.5 milliliters) and methyl cellosolve (125.0 milliliters). This mixture was placed in a 500 milliliters three-necked round bottom flask under a nitrogen atmosphere with stirring at 68° C. To the homogeneous mixture was added benzoyl peroxide (1.5 grams) dissolved in styrene monomer (40.0 milliliters) containing the monomeric dye of Formula 2 (0.3 gram) permitting polymerization thereof. In approximately 10 minutes the polymerization mixture became cloudy indicating the formation of polymer particles. After polymerizing for 30 hours, the mixture was cooled and the particles were removed from the medium by centrifugation followed by decantation of the supernatant. The resulting particles were then washed twice with water by means of centrifugation. Thereafter, the aqueous suspension was then freeze dried to remove the polymer particles from water producing a free flowing self-colored toner polymer powder. The average diameter particle size of the colored powder as determined by a Coulter Counter was 10.5 microns with a GSD of 1.25. Incorporation of the dye or chromophore of Formula 2 was demonstrated by gel permeation chromatography of the particles dissolved in tetrahydrofuran. Also, the absorption spectrum of the high molecular weight fraction resulting from the GPC showed an absorption maximum in the visible due to the absorption of the dye chromophore which is attached to the polymer backbone, whereas no colored low molecular weight components were detected frther evidencing the presence of polymerized dye in the polymer particles.

EXAMPLE VIII

There were prepared self-colored polymer particles by first dissolving hydroxypropyl cellulose (5 grams, molecular weight: 60,000) in ethanol (200 milliliters) and water (50 milliliters). This mixture was placed in a 500 milliliter three-necked round bottom flask under a nitrogen atmosphere with stirring at 70° C. To the homogeneous mixture was added benzoyl peroxide (1.5 grams) dissolved in a styrene monomer (40 milliliters), and the dye monomer of Formula 5 (0.25 gram) permitting polymerization thereof. In approximately 10 minutes the polymerization mixture became cloudy indicating the formation of polymer particles. After polymerizing for 30 hours, the mixture was cooled and the average diameter particle size, as determined with a Brookhaven particle sizing apparatus, was 1 micron. Incorporation of the dye was demonstrated by gel permeation chromatography of the particles dissolved in a tetrahydrafuran solvent. Also, the visible spectrum of the polymer peak showed an absorption maximum associated only with the dye chromophore whereas no colored low molecular weight components were detected thereby further demonostrating the presence of polymerized dye in the polymer particles.

EXAMPLE IX

There was prepared self-colored copolymer particles by first dissolving Kalene stabilizer (3.0 grams, a copolymer of isobutylene and isoprene), in Isopar G (212.5 milliliters) and toluene (22.5 milliliters). This mixture was placed in a 500 milliliter three-necked round bottom flask under nitrogen atmosphere with stirring at 75° C. To the homogeneous mixture was added benzoyl peroxide (1.0 gram) dissolved in methyl methacrylate (4.0 milliliters) and styrene monomer (33.5 milliliters) with the dye monomer of Formula 4 (0.25 gram) permitting polymerization thereof. In approximately 20 minutes the polymerization mixture became cloudy indicating the formation of polymer particles. After polymerizing for 30 hours, the mixture was cooled and the particles removed from the medium by centrifugation followed by decantation of the supernatant. The resulting particles were then washed twice with hexane by means of a centrifugation procedure. Thereafter the suspension was then dried to remove the particles producing a free flowing self-colored toner polymer powder. The average diameter particle size of the powder was found by a Coulter Counter to be 5.0 microns with a GSD of 1.40. Incorporation of the dye was demonstration by gel permeation chromatography of the particles dissolved in a tetrahydrofuran solvent. The visible spectrum of the polymer peak showed an absorption maximum associated only with the dye chromophore whereas no low molecular weight colored components were detected thereby further demonstrating the presence of polymerized dye in the polymer particles.

EXAMPLE X

Poly(N-Vinyl-2-Pyrrolidone) Polymer Particles Colored with 1

Two grams of polyisobutylene-polyisoprene copolymer stabilizer with a molecular weight of 40,000 (Kalene 800, Hardman Company, N.J.) was dissolved in 100 milliliters of 2,2,4-trimethylpentane. The solution was heated to 75° C., purged with nitrogen for 30 minutes and 0.12 gram of azobisisobutyronitrile (AIBN) was added. Subsequently, there was added a mixture of 10 grams of N-vinyl-2-pyrrolidone, and 0.16 gram of the dye monomer of Formula 1 over a period of 30 minutes permitting polymerization thereof. The reaction was then allowed to proceed for 16 hours under constant stirring. Thereafter the latex resulting from the polymerization was then washed by repeated centrifugation and redispersion in cyclohexane. The resulting latex was then freeze dried. The average particle diameter of the resulting orange product polymer particles, as determined by light scattering, was found to be 0.5 micron. Subsequently, the polymer particles were dissolved in chloroform, and UV-visible spectroscopy indicated that the dye content of the orange particles was 0.4 mole percent when measured at 375 nanometers. Also, GPC analysis of these orange particles dissolved in ethyl acetate, and extraction studies indicated that the dye was covalently bound to the polymer chain.

EXAMPLE XI

Poly(Vinyl Acetate) Particles Colored with 2

Two grams of a polyisobutylene-polyisoprene copolymer was dissolved in 100 milliliters of 2,2,2-trimethylpentane at 75° C. The solution was purged with nitrogen for 30 minutes after which 0.15 grams of azobisisobutyronitrile (AIBN) was added followed by the addition of a mixture of 10 grams of vinyl acetate and 0.16 gram of the dye monomer of Formula 2 permitting polymerization thereof. The reaction was then allowed to proceed for 16 hours under constant stirring. The latex resulting from the polymerization was then washed by repeated centrifugation and redispersion in cyclohexane. Thereafter, the resulting latex was freeze dried from cyclohexane, dissolved in chloroform and the dye content in the resulting toner particles was 1 mole percent as determined by UV-visible spectroscopy at 515 nanometers. Light scattering studies revealed that the average particle diameter of the polymer latex was 0.4 micron. GPC studies confirmed that the dye was covalently bonded to the polymer chain of molecular weight of 16,000 as compared to a polystyrene standard. The toner particles that were formed were bright red in color.

EXAMPLE XII

Poly(Methylmethacrylate) Particles Colored with the Compound of Formula 3

Two grams of poly(2-ethylhexylmethacrylate-g-vinyl acetate) copolymer dissolved in 100 milliliters of a 1:1 cyclohexane/2,2,4-trimethylpentane mixture was heated to 70° C., purged with nitrogen for 30 minutes and 0.15 gram of AIBN was added to the solution. After 30 minutes a mixture of 10 grams of methyl methacrylate and 0.16 gram of the dye monomer of Formula 3 was added to the solution over a period of 30 minutes permitting polymerization thereof. The reaction was then allowed to proceed for 12 hours under constant stirring. The latex resulting from the polymerization was then washed by centrifugation and redispersion in cyclohexane. The clean latex was then freeze dried. The average particle diameter of the resulting blue powder, as determined by light scattering, was 1 micron. Thereafter, the resulting toner powder was then dissolved in chloroform yielding a homogeneous solution. Using UV-visible spectroscopic data at 250 nanometers, the dye content was determined to be 0.2 mole percent. It was also confirmed by GPC analysis that the dye of Formula 3 was covalently bonded to the polymer chain.

EXAMPLE XIII

Poly(Ethylacrylate) Particles Colored with 4

Two grams of a polyisobutylene-polyisoprene copolymer (Kalene 800) were dissolved in 100 milliliters of 2,2,4-trimethylpentane by heating to 75° C. The solution was purged with nitrogen and 0.15 gram of azobisisobutyronitrile (AIBN) added, followed by the addition of 10 grams of ethylacrylate and 0.2 gram of the dye monomer of Formula 4 permitting polymerization thereof. The reaction was allowed to proceed for 10 hours under constant stirring. Thereafter, the resulting latex that was formed was washed by centrifugation and redispersion in cyclohexane. Light scattering indicated an average particle diameter of 0.4 micron for the purple powder isolated. GPC analysis of the resulting powder particles in ethyl acetate indicated that the dye was covalently bonded into the polymer chain of molecular weight 72,000 relative to a polystyrene standard.

EXAMPLE XIV

Poly(Methylmethacrylate) Particles Colored with 4

Two grams of a polyisobutylene-polyisoprene stabilizer were dissolved in 100 millimeters of 2,2,4-trimethylpentane at 75° C. The solution was purged with nitrogen for 30 minutes after which time 0.18 gram of benzoyl peroxide was added, followed one hour later by the addition of 10 grams of methylmethacrylate and 0.3 gram of the dye monomer of Formula 4 permitting polymerization thereof. The reaction was then allowed to proceed overnight with constant stirring. After cooling the resulting latex was washed by repeated centrifugation and redispersion in fresh cyclohexane. The washed latex was then freeze dried. Light scattering and scanning electron microscopy indicated an average purple powder particle size diameter of 1–2 microns for the resulting particles. UV-visible spectroscopy of a solution of the purple powder particles in chloroform indicated that the concentration of dye in the polymer was 2.2 mole percent.

Other modifications of the present invention may occur to those skilled in the art based upon a reading of the present disclosure and these modifications, including equivalents thereof, are intended to be included within the scope of the present invention.

What is claimed is:

1. A dispersion polymerization process for affecting the preparation of colored particles which comprises dissolving in a solvent selected from the group consisting of aliphatic alcohols, aliphatic hydrocarbons, and mixtures thereof a mixture of at least two first monomer components including at least one second monomer having covalently attached thereto a dye moiety, wherein the second monomer is present in an amount of from about 0.5 to about 10 percent by weight and the other monomer components are present in an amount of from about 90 to about 99.5 percent by weight, subsequently adding to the resulting reaction mixture a free radical polymerization initiator, thereafter affecting polymerization of the reaction mixture by heating, and separating the product particles therefrom, thereby resulting in said colored particles with an average diameter of from about 0.1 to about 20 microns.

2. A process in accordance with claim 1 wherein the monomer is a styrene compound.

3. A process in accordance with claim 1 wherein the first monomer is a mixture of two comonomers.

4. A process in accordance with claim 1 wherein the mixture of monomers is comprised of a first monomer, a second monomer having covalently attached thereto a dye moiety, and a third monomer.

5. A process in accordance with claim 1 wherein the monomer components are comprised of a first monomer, a second monomer having covalently attached thereto a dye moiety, and a third monomer having covalently attached thereto a dye moiety.

6. A process in accordance with claim 1 wherein the second monomer is 1,5-dihydroxy-2,6-diisobutyl-4-(3'-methacryloylamidophenylthio)anthraquinone.

7. A process in accordance with claim 1 wherein the second monomer is 1,5-dihydroxy-2,6-diisobutyl-4-methacryloylamido anthraquinone.

8. A process in accordance with claim 1 wherein the second monomer is 4-amino-1,8-dihydroxy-2,7-diisobutyl-5-methacryloylamido anthraquinone.

9. A process in accordance with claim 1 wherein the second monomer is N-(3'-methacryloylpropyl) 1-amino-4-(N-methacrylamido) anthraquinone-2,3-dicarboximide.

10. A process in accordance with claim 1 wherein the polymerization is accomplished at a temperature of from about 50° C. to about 100° C.

11. A dispersion polymerization process for effecting the preparation of colored particles which comprises dissolving in a suitable solvent a mixture of at least two first monomer components including at least one second monomer having covalently attached thereto a dye moiety, wherein the second monomer is present in an amount of from about 0.5 to about 10 percent by weight and the other monomer components are present in an amount of from about 90 to about 99.5 percent by weight, subsequently adding to the resulting reaction mixture a free radical polymerization initiator, thereafter effecting polymerization of the reaction mixture by heating, and separating the product particles therefrom, thereby resulting in said colored particles with an average diameter of from about 0.1 to about 20 microns, wherein the solvent selected is an aliphatic hydrocarbon.

12. A dispersion polymerization process for effecting the preparation of colored particles which comprises dissolving in a suitable solvent a mixture of at least two first monomer components including at least one second monomer having covalently attached thereto a dye moiety, wherein the second monomer is present in an amount of from about 0.5 to about 10 percent by weight and the other monomer components are present in an amount of from about 90 to about 99.5 percent by weight, subsequently adding to the resulting reaction mixture a free radical polymerization initiator, thereafter effecting polymerization of the reaction mixture by heating, and separating the product particles therefrom, thereby resulting in said colored particles with an average diameter of from about 0.1 to about 20 microns, wherein the solvent selected is an aliphatic alcohol.

13. A dispersion polymerization process for effecting the preparation of colored particles which comprises dissolving in a suitable solvent a mixture of at least two first monomer components including at least one second monomer having covalently attached thereto a dye moiety, wherein the second monomer is present in an amount of from about 0.5 to about 10 percent by weight and the other monomer components are present in an amount of from about 90 to about 99.5 percent by weight, subsequently adding to the resulting reaction mixture a free radical polymerization initiator, thereafter effecting polymerization of the reaction mixture by heating, and separating the product particles therefrom, thereby resulting in said colored particles with an average diameter of from about 0.1 to about 20 microns, wherein the solvent is 2,2,4-trimethylpentane.

14. A process in accordance with claim 1 wherein the further treatment includes freeze drying or spray drying.

15. A process for the preparation of colored toner particles which comprises dissolving in a solvent selected from the group consisting of aliphatic alcohols, aliphatic hydrocarbons, and mixtures thereof a mixture of at least two first monomer components including at least one second monomer having covalently attached thereto a dye moiety, wherein the second monomer is present in an amount of from about 0.5 to about 10 percent by weight and the other monomer components are prsent in an amount of from about 90 to about 99.5 percent by weight; subsequently adding to the resulting reaction mixture a free radical polymerization initiator; thereafter affecting polymerization of the reaction mixture by heating; separating the product particles therefrom; and subjecting these particles to freeze drying or spray drying, thereby resulting in said colored toner particles with an average diameter of from about 0.1 micron to about 20 microns.

16. The process in accordance with claim 15 wherein the second monomer is 1,5-dihydroxy-2,6-diisobutyl-4-(3'-methacryloylamidophenylthio)anthraquinone.

17. A process in accordance with claim 15 wherein the second monomer is 1,5-dihydroxy-2,6-diisobutyl-4-methacryloylamido anthraquinone.

18. A process in accordance with claim 15 wherein the second monomer is 4-amino-1,8-dihydroxy-2,7-diisobutyl-5-methacryloylamido anthraquinone.

19. A process in accordance with claim 15 wherein the second monomer is N-(3'-methacryloylpropyl) 1-amino-4-(N-methacryloylamido) anthraquinone-2,3-dicarboximide.

20. A dispersion polymerization process for affecting the preparation of colored particles which comprises dissolving in a solvent selected from the group consisting of aliphatic alcohols, aliphatic hydrocarbons, and mixtures thereof a first monomer component, a second monomer component having covalently attached thereto a dye moiety, wherein the second monomer is present in an amount of from about 0.5 to about 10 percent by weight and the other monomer components are present in an amount of from about 90 to about 99.5 percent by weight; and thereafter adding to the aforementioned components a free radical polymerization initiator, subsequently affecting polymerization of the resulting mixture by heating; and thereafter separating the product particles therefrom, thereby resulting in said colored particles with an average diameter of product particles is from about 0.1 to about 20 microns.

21. A dispersion polymerization process for effecting the preparation of colored particles which comprises dissolving in a solvent selected from the group consisting of aliphatic alcohols, aliphatic hydrocarbons, and mixtures thereof a first monomer component, a second monomer component having covalently attached thereto a dye moiety, wherein the second monomer is present in an amount of from about 0.5 to about 10 percent by weight and the other monomer components are present in an amount of from about 90 to about 99.5 percent by weight; and thereafter adding to the aforementioned components a free radical polymerization initiator, subsequently effecting polymerization of the resulting mixture by heating; and thereafter separating the product particles therefrom, thereby resulting in said colored particles with an average diameter of the product particles is from about 0.1 to about 20 microns, wherein the aliphatic alcohol solvent is selected from the group consisting of methanol, ethanol, propanol, and butanol.

22. A dispersion polymerization process for effecting the preparation of colored particles which comprises dissolving in a solvent selected from the group consisting of aliphatic alcohols, aliphatic hydrocarbons, and mixtures thereof a first monomer component, a second monomer component having covalently attached thereto a dye moiety, wherein the second monomer is present in an amount of from about 0.5 to about 10 percent by weight and the other monomer components are present in an amount of from about 90 to about 99.5 percent by weight; and thereafter adding to the aforementioned components a free radical polymerization initiator, subsequently effecting polymerization of the resulting mixture by heating; and thereafter separating the product particles therefrom, thereby resulting in said colored particles with an average diameter of the product particles is from about 0.1 to about 20 microns, wherein the aliphatic hydrocarbon solvent is selected from the group consisting of hexane, cyclohexane, heptane, Isopar G, and mixtures thereof.

23. A dispersion polymerization process for effecting the preparation of colored particles which comprises dissolving in a solvent selected from the group consisting of aliphatic alcohols, aliphatic hydrocarbons, and mixtures thereof a first monomer component, a second monomer component having covalently attached thereto a dye moiety, wherein the second monomer is present in an amount of from about 0.5 to about 10 percent by weight and the other monomer components are present in an amount of from about 90 to about 99.5 percent by weight; and thereafter adding to the aforementioned components a free radical polymerization initiator, subsequently effecting polymerization of the resulting mixture by heating; and thereafter separating the product particles therefrom, thereby resulting in said colored particles with an average diameter of the product particles is from about 0.1 to about 20 microns, wherein the solvent is a cellosolve selected from the group consisting of methylcellosolve, ethylcellosolve, and butylcellosolve.

24. A process in accordance with claim 20 wherein the solvent is present in an amount of from about 50 percent to about 90 percent of the total mixture.

25. A process in accordance with claim 20 wherein there is dissolved a stabilizer additive in the solvent and homogenization of the components are effected prior to affecting polymerization.

26. A process in accordance with claim 1 wherein the dye moiety is present in an amount of from about 3 percent by weight to about 5 percent by weight.

* * * * *